UNITED STATES PATENT OFFICE.

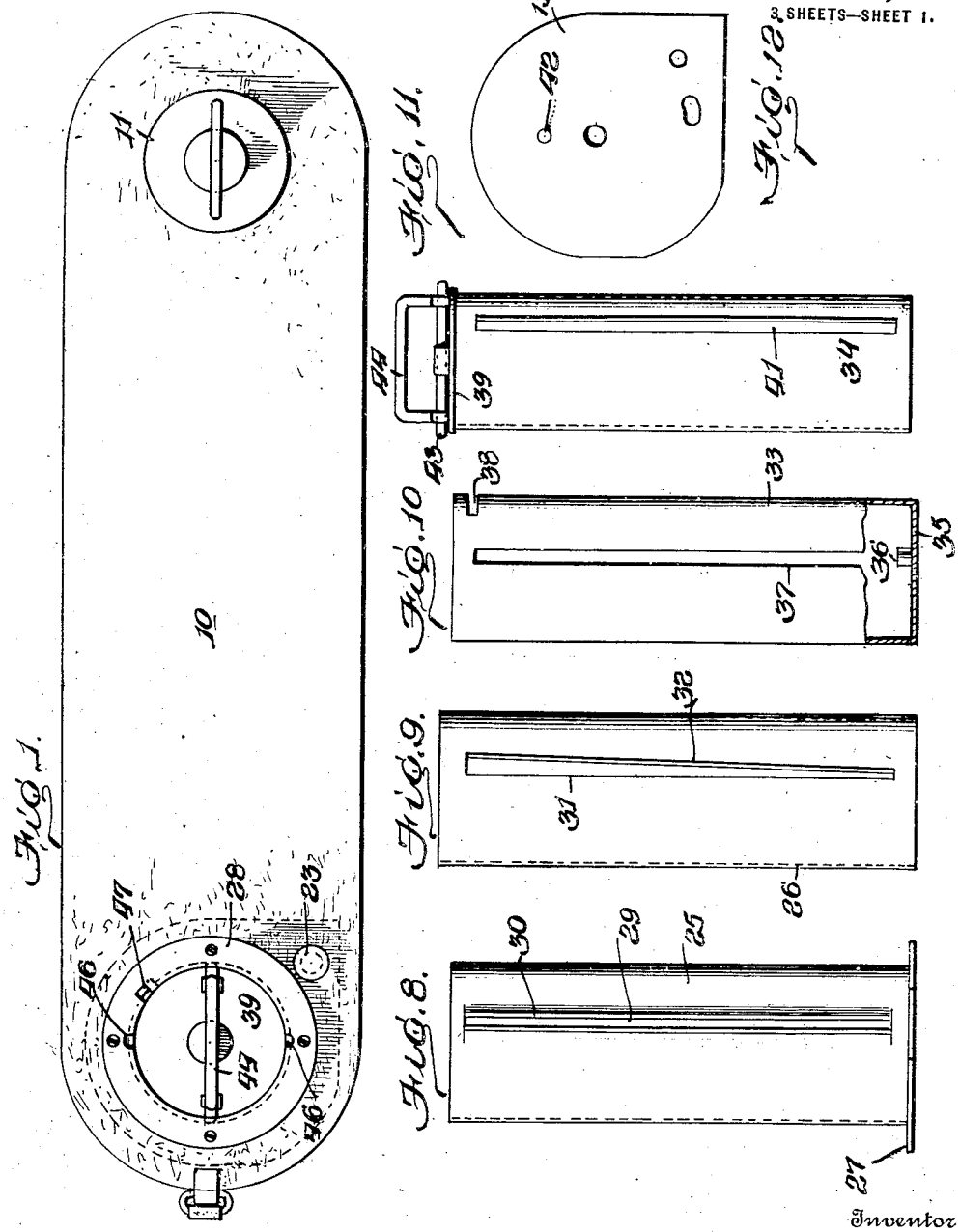

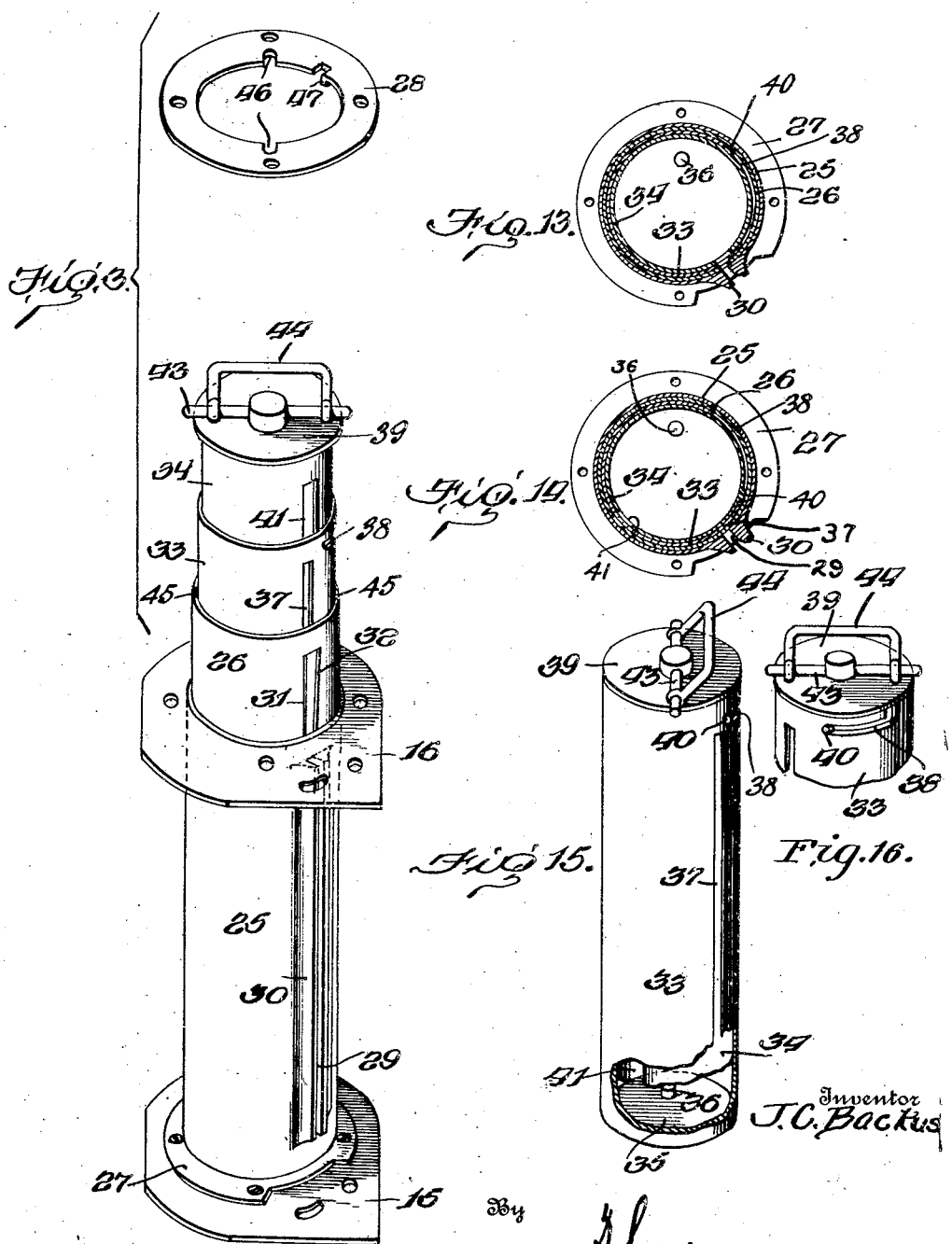

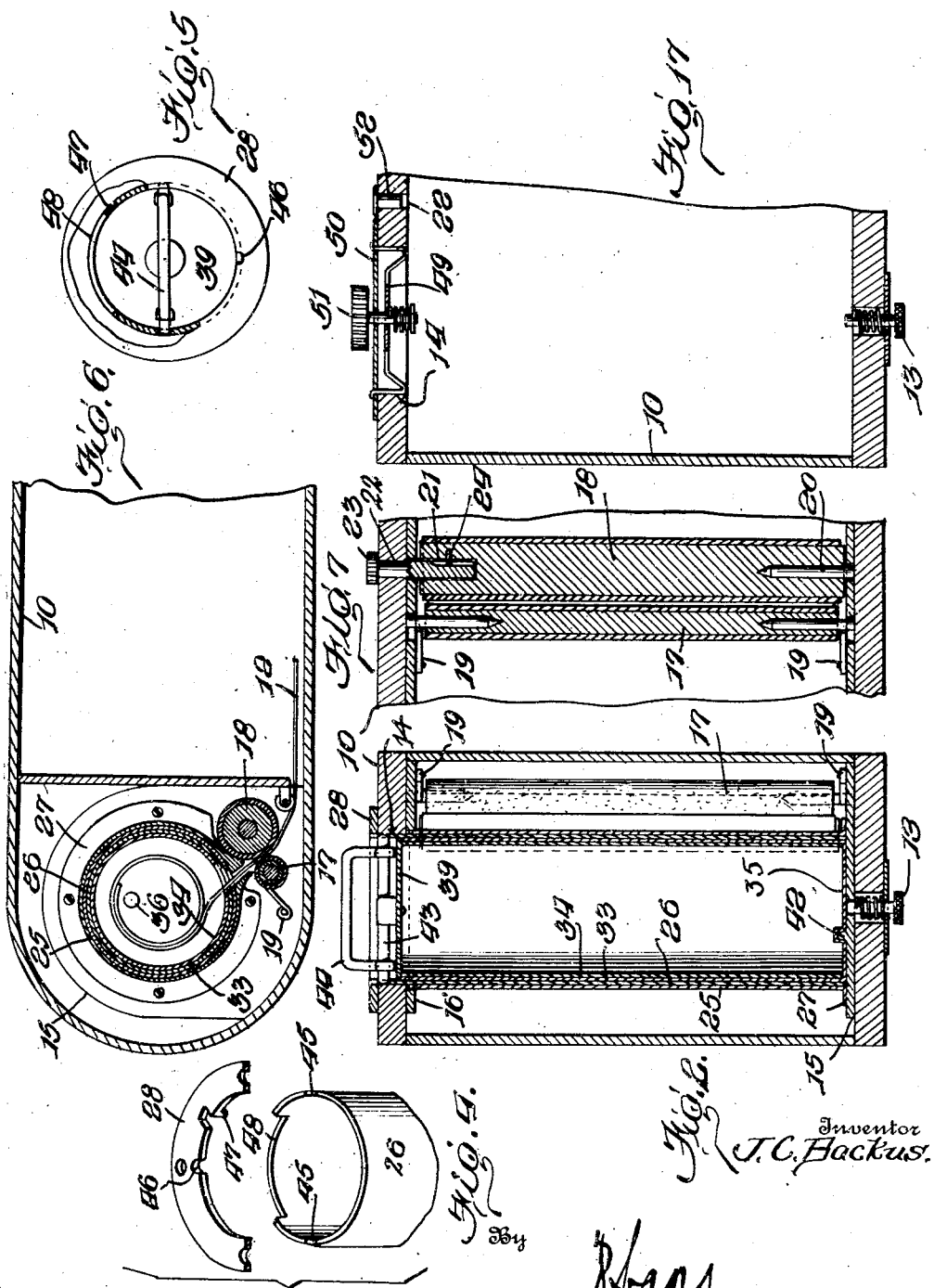

JOHN CLAYTON BACKUS, OF SMETHPORT, PENNSYLVANIA.

PHOTOGRAPHIC-FILM HOLDER.

1,363,217.  Specification of Letters Patent.  Patented Dec. 28, 1920.

Application filed June 22, 1916. Serial No. 105,256.

*To all whom it may concern:*

Be it known that I, JOHN CLAYTON BACKUS, a citizen of the United States, residing at Smethport, in the county of McKean and State of Pennsylvania, have invented certain new and useful Improvements in Photographic-Film Holders, of which the following is a specification.

This invention relates to an improved film holder for cameras or other photographic apparatus and has as its primary object to provide a device of this character wherein the portion of the film which has been exposed may be cut off from the film roll and removed from the camera so that, if desired, it may be immediately developed.

The invention has as a further object to provide a construction wherein the exposed portion of the film may, without likelihood of injury thereto or without likelihood of injury to the unused portion of the film, be removed in the daytime, or in the light.

And a still further object of the invention is to provide a device of this character which may be readily installed and used in connection with substantially any conventional type of camera, thus making it easily possible to equip cameras now in use with the improved holder.

Other and incidental objects will appear as the description proceeds and in the drawings wherein I have illustrated the preferred embodiment of the invention and wherein similar reference characters designate corresponding parts throughout the several views:

Figure 1 is a plan view showing a conventional type of camera equipped with my improved device, Fig. 2 is a sectional view more particularly showing the mounting of the holder within the camera with the film receptacle ready to be removed, Fig. 3 is a perspective view on a slightly enlarged scale showing the relative arrangement of the coacting sections of the receptacle when fitted together in operative position with the said sections arranged in position to receive a film within the film holder and also showing the stop plate employed in connection with the film receptacle, Fig. 4 is a fragmentary perspective view showing the slot provided in the inner casing section of the holder to receive the stop lug of the stop plate, Fig. 5 is a plan view partly broken away and illustrating the manner in which the stop lug is adapted to engage in the said slot for limiting the film receptacle in its movement to open and closed positions, Fig. 6 is a transverse sectional view more particularly showing the manner in which the film is fed into the holder, Fig. 7 is a vertical sectional view showing the mounting of the feed rollers for the film, Fig. 8 is a side elevation showing the outer casing section of the holder and illustrating the arrangement of the film receiving slot formed therein, Fig. 9 is a similar view showing the inner casing section with the film receiving slot formed therein, one wall of which is arranged to provide a longitudinally inclined cutting edge, Fig. 10 is a view similar to Fig. 9 and illustrating the outer section of the film receptacle, Fig. 11 is a view similar to Fig. 10 and illustrating the inner section of the film receptacle, Fig. 12 is a plan view of one of the supporting plates for the holder, Fig. 13 is a transverse sectional view showing the disposition of the sections of the holder for receiving the film within the film receptacle, Fig. 14 is a similar view showing the disposition of the sections of the holder when the film receptacle is closed and ready to be removed, Fig. 15 is a perspective view showing the film receptacle detached, Fig. 16 is a fragmentary perspective view of the outer end of the film receptacle and illustrating the manner in which the sections thereof are detachably connected, and Fig. 17 is a vertical sectional view of the camera casing with the film holder removed therefrom and showing a closure plug and winding key fitted into the adjacent side of the casing to adapt the camera for receiving a film spool in the ordinary manner.

In order to more clearly illustrate the construction and mounting of my improved holder, I have shown the device in connection with a conventional type of camera 10 having the usual exposure field and provided at one end with coacting centering pins 11 upon which is detachably mounted a film spool carrying a film 12 movable across the said exposure field. At its opposite end, the camera is provided at one side with the usual centering pin 13 and for the purposes of the present invention, is formed upon its opposite side with an opening 14.

In carrying out the invention, I employ coacting opposed supporting plates 15 and 16 respectively, arranged within the camera to seat against the sides thereof. The plate 15 is, as shown in detail in Fig. 12 of the drawings, provided with an opening to freely receive the centering pin 13 while the plate 16 is provided with an opening to register with the opening 14 in the adjacent side of the camera. Journaled upon the plates 15 and 16 to extend transversely therebetween, are coacting feed rollers 17 and 18 respectively. The plates 15 and 16, are, as best shown in Fig. 13, provided with elongated openings to receive the trunnions of the roller 17 and bearing against the said trunnions are tensioning springs 19 for urging the said roller to coact with the roller 18 in engaging the film 12 which is fed therebetween. The roller 18, at one end, is provided with a suitable trunnion 20 engaging in the plate 15 and at its opposite end, is formed with a hollow trunnion 21 received within a suitable opening in the plate 16. Registering with this opening, is an opening 22 formed in the adjacent side of the camera 10. Removably fitted through the opening 22 to be received within the trunnion 21 is a key 23 which, upon one side thereof, is slotted to receive a pin 24 projecting into the said trunnion. As will now be clear, the key 23 may be turned for rotating the roller 18 to feed the film 11 between the said roller and the roller 17.

Mounted between the plates 15 and 16, is a casing which includes an outer cylindrical section 25 in which is telescopically fitted an inner cylindrical section 26. The section 25 is, at one end, provided with a flange 27 secured, in any approved manner, to the plate 15 while the opposite end of the said section is received within the opening in the plate 16 to abut the adjacent side of the camera with the said section arranged axially of the opening 14. In this connection, it will be observed that the flange 27 is cut away to receive the adjacent portions of the feed rollers 17 and 18. The section 25 is open at its ends as is also the section 26. Consequently, the section 26 rests, as best seen in Fig. 2 of the drawings, upon the plate 15 while its outer end projects through the opening 14 in the adjacent side of the camera to terminate flush with the outer face thereof. Surrounding the opening 14 and secured by screws or other suitable fastening devices to the said side of the camera is an annular stop plate 28 which is of an internal diameter equal to the internal diameter of the casing section 26 so that the plate thus overlies the outer end of the said section for retaining it in position.

Attention is now directed to the fact that in mounting the device within the camera, the casing section 25 may first be secured at one end to the plate 15, the plate 16 being fitted over the other end of the said section. The feed rollers 17 and 18 are then arranged between the said plates and journaled thereon when the said rollers, the plates, and the casing section are then bodily fitted into the camera so as to engage the plate 15 with the centering pin 13. The plates 15 and 16 are then rotated about the axis of the casing section 25 to dispose the feed rollers in the position shown in Fig. 6 of the drawings when the plates 15 and 16 are detachably fixed to the inner sides of the camera by screws or other suitable fastening devices. The inner casing section 26 is then fitted into the casing section 25 and the stop plate 28 applied when the casing and the feed rollers will be arranged in active position. The section 25 is, upon one side thereof, provided with a longitudinally extending film receiving slot 29 upon opposite sides of which are arranged guide flanges 30 for the film. The section 26 is rotatably mounted within the section 25 and is snugly fitted therein so that light cannot enter between the said sections. Formed in the section 26, upon one side thereof, is a film receiving slot 31 best illustrated in Fig. 9 of the drawings. This slot is adapted to register with the slot 29 in the section 25 and one wall thereof is formed to provide a longitudinally inclined cutting edge 32.

Associated with the casing, is a film receptacle including an outer cylindrical section 33 which telescopically receives an inner cylindrical section 34. The section 33 is, at one end, closed by a bottom wall 35 in which is formed an eccentric outwardly opening socket 36. Formed in the said section, upon one side thereof, is a longitudinally extending film receiving slot 37 adapted to register with the slots 29 and 31 of the sections of the casing. The section 33 is, as best seen in Fig. 16, further provided, adjacent its upper end, with a bayonet slot 38 extending circumferentially of the said section substantially 90°. The section 34 of the film receptacle is open at its lower end to rest upon the bottom wall 35 of the section 33 and is closed at its upper end by a top wall 39. Extending radially from the section 34 upon one side thereof, is a lug or pin 40 adapted to removably fit within the slot 38 of the section 33 for separably connecting the said sections with the top wall 39 of the section 34 projecting radially over the open end edge of the section 33 to close the said section. The section 34 is, as best shown in Fig. 11 of the drawings, provided upon one side thereof with a longitudinally extending film receiving slot 41 adapted to register with the slot 37 of the section 33 as well as with the slots 29 and 31 of the sections of the casing. As will now be seen, the section 34 may re rotated 90° within the section 33 or a distance equal to the length of the slot 38 and in this connection, attention is directed to the fact that the slot 41 of the section 34 is so arranged relative to the slot 37 of the section 33 that these slots register when the pin 40 is disposed opposite the mouth of the slot 38 and are out of register when the said pin is engaged within the inner end of the slot to connect the said sections and thus form a closed light-tight film receptacle. The section 34 is, of course, snugly fitted within the section 33 so that light cannot enter between the said sections.

The film receptacle is adapted to be removably received within the casing formed by the sections 25 and 26 and is inserted in the said casing through the stop plate 28 with the section 33 of the film receptacle fitting snugly within the section 26 of the casing so that light cannot enter between the said sections. It will be noted, as best seen in Fig. 2 of the drawings, that when the film receptacle is thus arranged within the casing, the bottom wall 35 of the section 33 of the said receptacle will seat against the inner side of the plate 15 and this plate is formed with an eccentrically located upstanding stop lug or pin 42 adapted to detachably engage within the socket 36 for holding the outer section 33 of the receptacle fixed with respect to the outer section 25 of the casing with the slots 29 and 37 of the said sections disposed opposite each other.

Mounted upon the end wall 39 of the section 34 of the film receptacle is a transversely extending locking rod or member 43 to which is connected a bail or handle 44. The rod 43 projects radially of the film receptacle and the ends of this rod are arranged to detachably engage in suitable diametrically arranged notches 45 formed, as best seen in Fig. 4 of the drawings, in the adjacent outer end of the section 26 of the casing. Consequently, when the film receptacle is disposed within the casing and the handle 44 is operated to rotate the inner section 34 of the film receptacle, the inner section 26 of the casing will, through the medium of the rod 43, be caused to rotate therewith, the outer section of the film receptacle and the outer casing section being in the meantime, held fixed in the manner previously described. In this connection, it should be observed that the notches 45 of the inner casing section 26 are so arranged that when the ends of the locking rod 42 are engaged therein, the slot 41 of the inner section of the film receptacle will be disposed opposite the slot 31 of the said inner casing section.

As more particularly shown in Fig. 3 of the drawings, the stop plate 28 is provided with diametrically arranged notches 46 adapted to freely receive the ends of the locking rod 43 so that the said rod, as the film receptacle is inserted within the casing, may be engaged beneath the said plate to coöperate therewith for retaining the film receptacle within the casing. Struck from the inner edge of the plate 28, upon one side thereof, is an inwardly directed stop lug 47 disposed for engagement in a suitable arcuate notch 48 formed in the outer end of the inner casing section 26. The notch 48 is substantially 90° in length. Accordingly, the locking rod 43 may be moved in opposite directions beneath the stop plate 28 to simultaneously rotate the inner section 34 of the film receptacle and the inner casing section 26, in the manner previously described, through an arc of substantially 90° when the stop lug 47 will selectively engage either end of the notch 48, the slot 38 in the outer section 33 of the film receptacle being of a length, as previously pointed out, to permit this movement of the inner section 34 of the receptacle relative to the outer section thereof.

Normally, the inner casing section 26 is arranged with the notches 45 thereof disposed opposite the notches 46 in the stop plate 38 in which position of the said casing section, the film receiving slot 31 therein will, as illustrated in Fig. 14, be advanced a quarter turn from the slot 29 in the outer casing section 25. When inserting the film receptacle within the casing, the sections 33 and 34 of the said receptacle are assembled, as illustrated in Fig. 15 of the drawings, with the lug 40 engaging within the inner end of the slot 38. In this position of the said sections, the slot 41 in the inner section of the receptacle will be advanced a quarter turn from the slot 37 in the outer section 33 of the said receptacle. The receptacle is then fitted through the stop plate 28 and the ends of the locking rod 43 passed through the notches 46 of the said plate to engage the said rod in the notches 45 of the inner casing section 26 and to, at the same time, engage the stud 42 of the plate 15 in the socket 36 of the outer section 33 of the receptacle. The rod is then rotated a quarter turn to the left to engage one end wall of the notch 48 in the inner casing section 26 with the stop lug 47, as shown in Fig. 5 of the drawings. This turning of the said rod will rotate the inner section 34 of the receptacle and the inner casing section 26 through an arc of substantially 90° to a position with the slots 31 and 41 thereof registering with the slots 29 and 37 of the outer casing section and the outer section of the receptacle respectively so that all of the said slots will then, as illustrated in Fig. 13 of the drawings, be in register, with the locking rod 43 engaging beneath the plate 28 to hold the receptacle within the casing. The free end of the film 12 may then be directed from the feed rollers 17 and 18 through the said slots into the film receiving receptacle, the natural tendency of the film to curl causing the said film to coil up within the receptacle as it is fed therein and as will be seen, the feed rollers may be operated to shift the film in the usual manner from the spool supported by the centering pins 11 across the exposure field into the film receptacle as the film is exposed.

Assuming now that it is desired to remove the exposed portion of the film, the handle 44 of the film receptacle is grasped and given a quarter turn to the right when the free ends of the locking pin 43 will again be brought opposite the notches 46 in the stop plate 28 with the stop lug 47 engaging in the end of the notch 48 opposite to that shown in Fig. 5 so that the receptacle may be withdrawn. This movement of the locking pin 43 will again simultaneously rotate the inner section 34 of the film receptacle and the inner section 26 of the casing and, as best seen in Fig. 6 of the drawings, cause the cutting edge 32 of the said casing section to shear the film against the adjacent wall of the slot 29 in the outer casing section 25 and thus free the exposed portion of the film within the film receptacle. In this connection, it will be observed that the slot 41 in the inner section 34 of the film receptacle is slightly wider than the slot 37 in the section 33 of the said receptacle. Furthermore, the cutting edge 32 of the inner casing section 26 is, when the several slots 29, 31, 37 and 41 are in register, arranged in advance of the contiguous edges of the slots 37 and 41 of the sections of the film receptacle. Consequently, when the inner casing section 26 is thus rotated, the cutting edge 32 thereof will clip off the exposed portion of the film before the slots 37 and 41 of the sections of the film receptacle are moved out of register and thus permit the adjacent end of the said exposed portion of the film to move into the film receptacle before the said receptacle becomes closed.

It will therefore be seen that by shifting the locking pin 43 to release the film receptacle, the exposed portion of the film will be automatically cut off while, at the same time, the sections of the film receptacle will be moved to close the said receptacle and will be locked in such position by the pin 40. At the same time, the slot 31 of the inner casing section 26 will, as shown in Fig. 14 of the drawings, be moved out of register with the slot 29 of the outer casing section 25 to close the casing with respect to the interior of the camera 10 so that the film receptacle containing the exposed portion of the film may then be removed from the casing without likelihood of any light reaching the unexposed portion of the film or reaching the exposed portion of the film within the film receptacle. Consequently, the exposed portion of the film may be cut off and removed from the camera in the daytime or in the light.

As will be readily understood from the preceding description, the film receptacle and the inclosing casing therefor of my improved holder comprehends a means for severing a portion of the film and means for inclosing such severed portion.

It will therefore be seen that I provide a very simple and efficient construction for the purpose set forth. However, it may sometimes be found desirable to dispense with the film holder and employ a film spool within the camera in lieu thereof in the ordinary manner. To accomplish this result, the film receptacle is removed and the plate 28 taken off so that the inner casing section 26 may be removed. The plates 15 and 16 are then disconnected and the key 23 taken out when the inner casing section together with the said plates and the feed rollers 17 and 18 may be removed. To then adapt the camera for an ordinary film spool, I employ a winding key plug 49 adapted to snugly fit into the opening 14 with the body plate 50 of the said plug lying against the outer face of the adjacent side of the camera to be secured thereto by the screws formerly holding the stop plate 28. Mounted upon the plug 49 is a winding key 51 adapted to coöperate with the centering pin 13 in receiving a film spool in the usual manner with the key 51 adapted for rotation to turn the spool. A closure plug 52 is also provided for the opening 22 in the side of the camera, this opening formerly receiving the winding key 23. With the plugs 49 and 52 in position, the camera is adapted to receive and operate in connection with conventional types of film spools in the customary manner.

Having thus described my invention, what I claim and desire to secure by Letter Patent:

1. In a film camera, means for receiving and excluding light from an exposed portion of a film strip, the said means being bodily removable from the camera independently of the unexposed portion of the film strip, and means operable to sever from the film strip the exposed portion thereof delivered to the receiving means.

2. In a film camera, means for storing and feeding a film strip, means for receiving and excluding light from an exposed portion of said strip, the said means being bodily removable and disassociable from the storing and feeding means, and means for severing from the strip the said exposed portion thereof.

3. A film holder for photographic apparatus including film severing means, and a sectional film receptacle having the sections thereof shiftable relative to each other incident to the actuation of said severing means for inclosing, so as to exclude light, a portion of a film severed by the said means.

4. In a film camera, a film receptacle operable to be opened to receive an exposed portion of a film strip and to be closed to protect the said portion of the film strip from actinic light rays, a casing in which the receptacle is mounted and from which it may be removed, the casing being operable to provide an opening for the passage of the film strip into the receptacle and close said opening, and means connecting the operating part of the receptacle and casing for movement in consonance with each other.

5. A film holder for photographic apparatus, including a casing adapted to be opened and closed and provided with film severing means, a film receptacle mounted within the casing for receiving film through the casing, and connecting means between the casing and receptacle whereby the closing of the receptacle will operate to close the casing and actuate said severing means to cut off the portion of the film within said receptacle to be inclosed thereby.

6. In a device of the character described, a casing, a film receptacle mounted therein, the casing and receptacle being each adapted to be opened and closed whereby when both are opened the receptacle may receive a film through the casing, and means connecting the receptacle and casing whereby the receptacle is operable to close both the casing and the receptacle.

7. In a device of the character described a casing, a sectional receptacle mounted therein, the casing and receptacle being each adapted to be opened and closed whereby when both are opened the receptacle may receive a film through the casing, means connecting the receptacle and casing whereby the said receptacle is operable to close the casing and close the said receptacle and means operable upon the closing of the receptacle for locking the sections thereof against accidental separation.

8. In a device of the character described, a casing provided with a film severing means, a receptacle mounted within the casing, the casing and receptacle being each adapted to be opened and closed whereby when both are opened the receptacle may receive a film through the casing, and connecting means between the casing and receptacle whereby the closing of the receptacle will operate to close the casing and actuate said severing means to cut off the portion of the film received within the receptacle to be inclosed thereby.

9. In a device of the character described, a film receptacle adapted to be closed, a casing for the receptacle having an opening through which the film may pass into the receptacle and provided with film severing means, and connecting means between the casing and receptacle whereby the film severing means will be operated to sever the portion of the film within the receptacle upon the closing of the receptacle.

10. In the device of the character described, a casing provided with film severing means, a film receptacle mounted within the casing, the casing and receptacle being each adapted to be opened and closed whereby when both are opened the receptacle may receive a film through the casing, and means connecting the receptacle and casing whereby the receptacle is operable to close both the casing and the receptacle, the film severing means being operable for cutting off a portion of a film within the receptacle upon the closing of the receptacle.

11. In a device of the character described, a casing, a film receptacle telescopically received therein, the receptacle and casing being each adapted to be opened for establishing communication through the casing into the receptacle and being adapted to be closed for shutting off such communication, and means for limiting the opening and closing of the receptacle and casing.

12. In a device of the character described, a casing, a film receptacle telescopically received therein, the receptacle and casing being each adapted to be opened for establishing communication through the casing into the receptacle and being adapted to be closed for shutting off such communication, means for limiting the opening and closing of the receptacle and the casing, and means for locking the receptacle against accidental displacement from the casing.

13. In a device of the character described, a casing, a film receptacle mounted therein, the receptacle and casing being each adapted to be opened for establishing communication through the casing into the receptacle and being adapted to be closed for shutting off such communication, and locking means for retaining the receptacle within the casing, said locking means including an element connecting the receptacle and casing to effect their simultaneous opening and closing.

14. In a device of the character described, a casing including inner and outer slotted sections, a receptacle fitted within the casing and including inner and outer slotted sections, means for holding one of the sections of the receptacle and one of the sections of the casing stationary, and means for simultaneously shifting another section each of the casing and receptacle with respect to the fixed sections thereof for registering the slots of all of the sections or for disposing the slots of the casing sections and the slots of the sections of the receptacle respectively out of register.

15. In a device of the character described, a casing including inner and outer slotted sections one movable relative to the other, a receptacle fitted within the casing and including inner and outer slotted sections one movable relative to the other, means for holding one section each of the casing and receptacle fixed and so positioned that the slots of all the sections may be brought into register, means connecting another section each of the casing and receptacle whereby the movable sections may be shifted with respect to the fixed sections for disposing the slots of the casing sections and the slots of the sections of the receptacle respectively out of register, and means for locking the sections of the receptacle together when the slots thereof are disposed out of register.

16. A film holder for photographic apparatus including a film receptacle, a casing for the receptacle formed to receive a film therethrough into the receptacle and having a cutting edge, the casing being operable for clipping from the film by said edge an exposed portion of the film disposed within the said receptacle.

17. A film holder for photographic apparatus including a casing, a film receptacle removably fitted therein, the casing and receptacle being each adapted to be opened and closed, and locking means for retaining the receptacle within the casing and adapted to permit removal of the receptacle from the casing only when the receptacle is closed.

18. A film holder for photographic apparatus including a sectional film receptacle having one of the sections thereof movable to close the receptacle, film severing means operable for severing an exposed portion of a film disposed within the receptacle, and means for locking the sections of the receptacle together upon the movement of the said sections to close the receptacle.

19. A film holder for photographic apparatus including spaced supporting plates, a stud carried by one of said plates, a casing mounted between the plates and formed of inner and outer slotted sections, one of said sections being stationary and another being movable, a film receptacle mounted within the casing and formed of relatively movable inner and outer slotted sections, the bottom wall of the film receptacle being provided with a socket receiving said stud for holding one of the sections of the receptacle stationary, and means for shifting another section of the receptacle and said movable section of the casing simultaneously for registering the slots of all of said sections or for disposing the slots of the casing section and the slots of the sections of the receptacle respectively out of register.

20. In a film camera, a stationary stop plate having an opening, a film receptacle comprising relatively movable sections disposed one within the other and removable through the opening in the stop plate, and locking means carried by the receptacle for engagement with said plate to hold the sections against such removal accidentally.

21. In a film camera, a stop plate provided with a lug and having an opening, a casing formed of inner and outer slotted sections, one of said sections being stationary and another being movable, a film receptacle within the casing removable therefrom through the opening and formed of relatively movable slotted sections, means for holding one of the sections of the receptacle stationary, the movable section of the casing being formed with a notch receiving the lug of said plate, and means for shifting the movable section of the receptacle and the movable section of the casing simultaneously for registering the slots of all of the sections or for disposing the slots of the casing sections and the slots of the receptacle respectively out of register, said lug being disposed to engage in the notch for limiting the movable sections in their movement in opposite directions.

22. In a film camera, a stop plate provided with a notch and an opening, a sectional casing having an open end received within the opening in the stop plate, a sectional film receptacle removably fitted within the casing and adapted to be withdrawn through said opening, one of the sections of the receptacle and one of the sections of the casing being movable with respect to the other sections of the casing and receptacle respectively for opening both the casing and receptacle or for closing both the casing and receptacle, a locking member carried by the receptacle and receivable through the notch of said plate to engage therebeneath for retaining the receptacle within the casing, and means for limiting the movable sections in their movement to the closed position and for stopping the locking member opposite said notch.

23. In a film camera, of a stop plate having an opening, a casing having an open end received within the opening in the stop plate and having a stationary section and a movable section provided with a notch, a receptacle removably fitted within the casing and formed of relatively movable sections, means for holding one of the sections of the receptacle stationary, and a locking member carried by a movable section of the receptacle and fitting beneath said plate for retaining the receptacle within the casing, said member engaging within said notch and being operable for shifting the movable sections with respect to the fixed sections for opening both the receptacle and the casing.

24. The combination with a photographic apparatus employing a film and provided with a film spool trunnion and with an opening opposite said trunnion, of a film receptacle removably insertible through said opening to be operatively supported by the trunnion and operable for inclosing an exposed portion of the film, film severing means operatively connected with the receptacle and operable for clipping off such exposed portion of the film, and a plug for closing said opening after the removal of the receptacle and provided with a film spool trunnion adapted to coöperate with said first mentioned trunnion.

25. A film holder for photographic exposure apparatus including film severing means, and a film receptacle coacting with the severing means for clipping off an exposed portion of the film and inclosing the same so as to exclude light.

26. The combination with a photographic exposure apparatus employing a film, of means comprising film severing means, and a receptacle coacting with the severing means for clipping off an exposed portion of the film, inclosing the same so as to exclude light and removing it from the apparatus.

27. In combination with a camera casing having a film therein, of a receptacle carried by said casing and adapted to be closed, means for feeding the film into the receptacle to coil the same, means for severing the film within the receptacle from that without, and means for closing said receptacle to exclude the light, said receptacle being removable from the casing with the severed portion of the severed film therein.

28. The combination with a photographic apparatus, of stationary stop means, a film receptacle comprising telescopic sections, and means carried by one of said sections for engagement with the stop means to retain said sections one within the other.

29. A film holder for photographic apparatus including a casing formed with a section movable for closing the casing and provided with film severing means operable by the movement of said section, a film receptacle mounted within the casing for receiving a film through the casing and adapted to be closed, and means for shifting said section of the casing to close the casing and thereby cut off the portion of the film within said receptacle to be inclosed thereby.

30. In a film camera, means operable to sever from a film strip an exposed portion of the length thereof, and means for receiving the said portion of the strip and including a part operable to close the receiving means to exclude actinic light rays from the said portion of the strip, the receiving means being bodily removable and disassociable from the severing means.

31. In a film camera, means operable to sever from a film strip an exposed portion of the length thereof, means for receiving the said portion of the strip and including a part operable to close the receiving means to exclude actinic light rays from the said portion of the strip, the receiving means being bodily removable and disassociable from the severing means, and means for automatically actuating the severing means upon operation of the said closing part of the receiving means.

32. In a film camera, a film receptacle comprising a relatively stationary section and a section telescopically fitted within the first mentioned section and rotatable with respect thereto, the sections having openings to register in one position of adjustment of the last mentioned section to provide for the passage of film into the receptacle and to be brought out of registration in another position of adjustment of the last mentioned section whereby to inclose and protect from light the film received within the receptacle, and means operating in juxtaposition to the opening in the first mentioned section for severing the film.

33. In a film camera, a film receptacle comprising a relatively stationary section and a section telescopically fitted within the first mentioned section and rotatable with respect thereto, the sections having openings to register in one position of adjustment of the last mentioned section to provide for the passage of film into the receptacle and to be brought out of registration in another position of adjustment of the last mentioned section whereby to inclose and protect from light the film received within the receptacle, means operating in juxtaposition to the opening in the first mentioned section for severing the film, and means actuated through rotation of the first mentioned section of the receptacle for actuating the film severing means.

In testimony whereof I affix my signature.

JOHN CLAYTON BACKUS. [L. S.]